US011952252B2

(12) United States Patent
Goecke

(10) Patent No.: US 11,952,252 B2
(45) Date of Patent: Apr. 9, 2024

(54) LOW FOAM NOZZLE

(71) Applicant: The Procter & Gamble Company, Cincinnati, OH (US)

(72) Inventor: Ryan Scott Goecke, St. Bernard, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/889,498

(22) Filed: Aug. 17, 2022

(65) Prior Publication Data

US 2023/0060038 A1 Feb. 23, 2023

Related U.S. Application Data

(60) Provisional application No. 63/233,885, filed on Aug. 17, 2021.

(51) Int. Cl.
*B67C 3/26* (2006.01)
*B65B 3/22* (2006.01)

(52) U.S. Cl.
CPC .................. *B67C 3/26* (2013.01); *B65B 3/22* (2013.01); *B67C 2003/2671* (2013.01)

(58) Field of Classification Search
CPC ........... B65B 3/22; B67C 3/26; B67C 3/2608; B67C 2003/2671
See application file for complete search history.

(56) References Cited

U.S. PATENT DOCUMENTS 5,865,221 A * 2/1999 Ludwig .................. B67C 3/281 141/90
7,958,910 B2 * 6/2011 Nakamori ............... B65B 39/00 138/44
9,643,201 B2 * 5/2017 Toh ................... B05C 17/00543
9,849,470 B1 * 12/2017 Yattara .................. B67C 3/2608
2014/0077006 A1 * 3/2014 Goudy ...................... B05B 1/14 239/565
2017/0015452 A1 * 1/2017 Heuser .................... B65B 39/00
2017/0348707 A1 12/2017 Yattara et al.

FOREIGN PATENT DOCUMENTS

DE 102014104480 A1 10/2015
WO 9526906 A1 10/1995

OTHER PUBLICATIONS

16111 PCT Search Report and Written Opinion for PCT/US2022/075048 dated Dec. 2, 2022,11 pages.

* cited by examiner

*Primary Examiner* — Nicolas A Arnett
(74) *Attorney, Agent, or Firm* — Gary J. Foose

(57) ABSTRACT

Techniques regarding multi-hole nozzle architectures and/or manufacturing methods are provided. For example, one or more embodiments described herein can comprise a multi-hole nozzle component for a filling machine, the multi-hole nozzle component having a periphery, an inlet side having a surface, and an outlet side having a surface. The nozzle component can further comprise a plurality of separate passageways extending through the nozzle component from adjacent its inlet side to its outlet side. Also, the passageways can form a plurality of openings in the surface of the outlet side of the nozzle component. Further, each of the separate passageways can have a diameter of from about 1 mm to about 3 mm and a length of from about 5 mm to about 1.5 m.

14 Claims, 2 Drawing Sheets

LOW FOAM NOZZLE

FIELD OF INVENTION

The present invention pertains to nozzles utilized in bottle/container filling processes. More particularly, the present invention pertains to a low foaming nozzle.

BACKGROUND

Nozzles utilized for bottle/container filling processes are known. Typically, in an effort to save time during bottle filling operation, the bottle fill rate tends to be as high as possible. However, faster fill rates can potentially lead to foam generation in the container, particularly if the liquid is a cleaning solution. The generation of foam may seemingly be innocuous; however, foam takes up volume in the bottle/container being filled. And in an automated process, this can mean that liquid which would ordinarily be able to fit within the volume of the bottle/container instead now spills out the outer surface of the bottle/container and/or on the manufacturing equipment.

This spillage of liquid on the bottle/container can negatively impact the visual appearance of the bottle/container making it much less desirable in the eyes of the consumer. Additionally, this spillage of liquid on the manufacturing equipment can cause contamination issues, depending on the liquid spilled, and can create additional maintenance costs/downtime for the manufacturing line.

What is needed is a nozzle which can accommodate high flow rates with low or no foam creation. Additionally, what is needed is a nozzle that can accommodate high flow rates and reduce the likelihood of spillage of liquid outside of the bottle/container to be filled.

SUMMARY OF INVENTION

The nozzles of the present disclosure can accommodate high liquid flow rates with low foam creation. The nozzle of the present disclosure can therefore be utilized in filling processes and can reduce the likelihood of spillage of liquid outside of the bottle/container to be filled.

In one particular arrangement, a nozzle component comprises a plurality of holes for a filling machine, the nozzle having a periphery, an inlet side having a surface, and an outlet side having a surface, the nozzle further comprising a plurality of separate passageways extending through the nozzle from adjacent its inlet side to its outlet side, wherein the passageways form a plurality of openings in the surface of the outlet side of the nozzle, wherein each of the separate passageways has a diameter of from about 1 mm to about 3 mm and a length of from about 5 mm to about 1.5 m.

DETAILED DESCRIPTION

Figure 1:
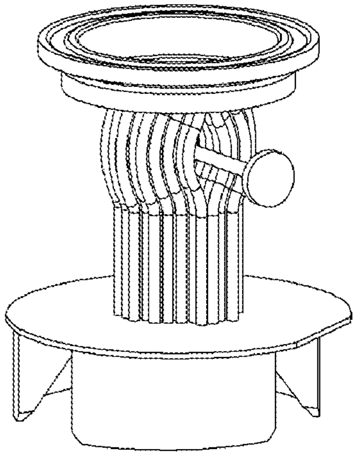
FIG. 1 is a schematic representation of an exemplary nozzle component in accordance with the present disclosure.

The following description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings. In the following description, for purposes of explanation, numerous specific details are set forth in order to provide a more thorough understanding of the one or more embodiments. It is evident, however, in various cases, that the one or more embodiments can be practiced without these specific details.

Various embodiments described herein can regard multi-hole nozzle components having a plurality of passageways to guide the disbursement of a fluid through the nozzle. Further, the plurality of passageways can be formed via one or more 3D printing technologies. Thereby, the plurality of passageways can be positioned in a dense configuration in the multi-hole nozzle. For example, the plurality of passageways can have a wall thickness ranging from, for example, greater than or equal to 0.05 mm and less than or equal to 5 mm (e.g., the passageways can be spaced 0.05 to 5 mm from each other).

Additionally, at least due to the 3D printing manufacturing process, the plurality of passageways can have large cross-area to length ratios. For instance, the plurality of passageways can have a circular cross-area with: a diameter ranging from, for example, greater than or equal to 1 mm and less than or equal to 3 mm; and a length ranging from, for example, greater than or equal to 0.5 mm and less than or equal to 1.5 m. In one or more embodiments, the plurality of passageways can have cross-areas with a circular shape or a polygonal shape (e.g., a rectangular shape, a star shape, and hexagonal shape, and/or the like). Further, at least due to the 3D printing manufacturing process, the plurality of passageways can extend through the multi-hole nozzle component in linear and/or non-linear geometries. It is worth noting that the non-linear geometry of passageways is not possible via conventional methods of manufacturing nozzles.

Innovations with Linear Passageway Geometries

One or more embodiments described herein can regard multi-hole nozzle components having a plurality of passageways with substantially linear geometries. For example, the multi-hole nozzle component can comprise a nozzle body, where the plurality of passageways can extend through the nozzle body from one or more inlet sides of the nozzle body to one or more outlet sides of the nozzle body. In one or more embodiments, the plurality of passageways can be formed integrally with the nozzle body. Additionally, the plurality of passageways can be spaced apart from each other by the thickness of the walls of the passageways. For instance, the plurality of passageways can have a wall thickness (e.g., and thereby a spacing) ranging from, for example, greater than or equal to 0.05 mm to less than or equal to 2 mm (e.g., 0.2 mm). In one or more embodiments, the number of passageways can range from, for example, greater than or equal to about 4 to less than or equal to about 1,000. In some embodiments, the number of passageways can be greater than 1,000. For example, the number of passageways can vary depending on the desired density of passageways and/or the size of the nozzle body.

In various embodiments, the plurality of passageways can have a circular cross-area with a diameter ranging from, for example, greater than or equal to 1 mm and less than or equal to 3 mm. Further, the plurality of passageways can have a length (e.g., from the inlet side to the outlet side) ranging from, for example, greater than or equal to 5 mm and up to, but not limited to, 1.5 m. For instance, the plurality of passageways can have a diameter to length ratio of up to 1:1500. Further, the nozzle passageways can extend through the nozzle body in a substantially straight direction. For example, the length of the plurality of passageways (e.g., from the inlet side to the outlet side) can be substantially linear. In one or more embodiments, the plurality of passageways can be substantially parallel to each other. For instance, the plurality of passageways can extend from the inlet side to the outlet side substantially free from twists, turns, mergers and/or splits.

Fluid can enter the plurality of passageways on the inlet side, flow through the nozzle body via the plurality of passageways and exit the plurality of passageways on the outlet side. In various embodiments, the large diameter to length ratio and/or linear geometry of the plurality of passageways can facilitate a laminar flow of the fluid through the plurality of passageways. Additionally, the laminar flow can reduce the formation of foam in low-viscosity fluids despite high flow rates through the plurality of passageways.

Additionally, US 2014/0077006, which is incorporated by reference herein in its entirety, depicts exemplary multi-hole nozzle components having passageways with linear geometries. In one or more embodiments, the nozzle and/or passageways described in US 2014/0077006 can be 3D printed in accordance various embodiments described herein to achieve a plurality of passageways with the structural dimensions, ratios, and/or geometries described herein; thereby enabling the unexpected results regarding foam reduction and increased flow rates.

Innovations with Non-linear Passageway Geometries

In one or more embodiments, the plurality of passageways can extend along one or more non-linear routes from one or more inlet sides to one or more outlet sides. For example, FIG. 1 illustrates a multi-hole nozzle component having a plurality of passageways extending in a non-linear geometry. As shown in FIG. 1, the plurality of passageways can include one or more curves, bends, and/or corners while extending from one or more inlet sides to one or more outlet sides. In some embodiments, a portion of the one or more passageways can extend from the inlet side to the outlet side and bend around one or more other features positioned within the nozzle body (e.g., as shown in FIG. 1). In some embodiments, the plurality of passageways can comprise linear portions and non-linear portions.

For instance, the plurality of passageways can include non-linear portions to: extend around one or more other features of the multi-hole nozzle component; alter the turbulence experienced by a fluid passing through the plurality of passageways; increase the total length of the plurality of passageways, a combination thereof, and/or the like. Additionally, the passageways can include bend toward or away from each other.

In various embodiments, the plurality of passageways can have one or more radial geometries. For example, the plurality of passageways can be positioned in one or more radial configurations within the nozzle body. For instance, the plurality of passageways can be configured as a plurality of concentric or non-concentric circles.

Innovations with Split/Merged Passageway Geometries

Figure 2:
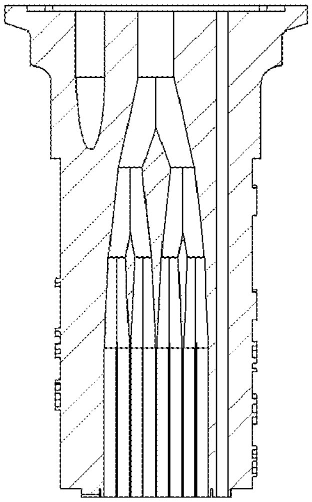
FIG. 2 is a schematic representation showing a cross-sectional view of a nozzle component constructed in accordance with the present disclosure.

In some embodiments, one or more passageways can merge together while extending from the inlet side to the outlet side. In some embodiments, one or more passageways can split into multiple passageways while extending from the inlet side to the outlet side. For example, FIG. 2 illustrates a multi-hole nozzle component having passageways that split from, and/or merge with, each other. For instance, a number of openings associated with passageways at the inlet side can be different than a number of openings associated with passageways at the outlet side. In various embodiments, the passageways can have linear and/or non-linear portions that split from, or merge with, one or more linear and/or non-linear portions of other passageways.

3D Printing the Plurality of Passageways

In various embodiments, the plurality of passageways can be formed via one or more 3D printing technologies. For example, the nozzle body can be 3D printed layer by layer through multiple iterations of a 3D printing process (e.g., an additive manufacturing process). With each iteration, a printing material (e.g., steel, stainless steel, a polymer, a plastic, ceramic, and/or the like) can be deposited in the shape of the nozzle body. For instance, deposition sites of the printing material can be locations where the nozzle body will be formed. Additionally, the 3D printing process can refrain from depositing the printing material in locations where the plurality of passageways will be formed. Once deposited, the printing material can be heat treated. For instance, one or more lasers can be employed to weld the deposited printing material.

The next iteration of the 3D printing process can deposit more printing material onto the previously heat treated printing material. Further, the newly deposited printing material can also be heat treated. For instance, one or more lasers can be employed to weld the newly deposited printing material to the previously deposited printing material. Thereby, the nozzle body, and associate features thereof, can be incrementally formed with each iteration of the 3D printing process. Additionally, the plurality of passageways can be defined during the multiple iterations of the 3D printing process via the absence of deposited printing material at the desired locations of the plurality of passageways.

Additionally, example types of 3D printing technologies that can be employed to form the nozzle body, and/or thereby the plurality of passageways, can include, but are not limited to: metal 3D printing using powder bed fusion ("PBF"); polymer 3D printing (e.g., where one or more polymers are extruded) using fused deposition modeling ("FDM"); ceramic 3D printing using PBF, a binding agent, and/or photopolymerization ("DLP"), a 3D printing process that uses light sensitive materials cured by light and/or lasers (e.g., rather than heated by stereolithography). Further, in various embodiments, the one or more 3D printing technologies can be employed to: form static mixers within the plurality of passageways; and/or form one or more cavities in the nozzle body to house various instruments (e.g., pressure sensors, temperature sensors, and/or the like).

Experiment Data

Figure 3:
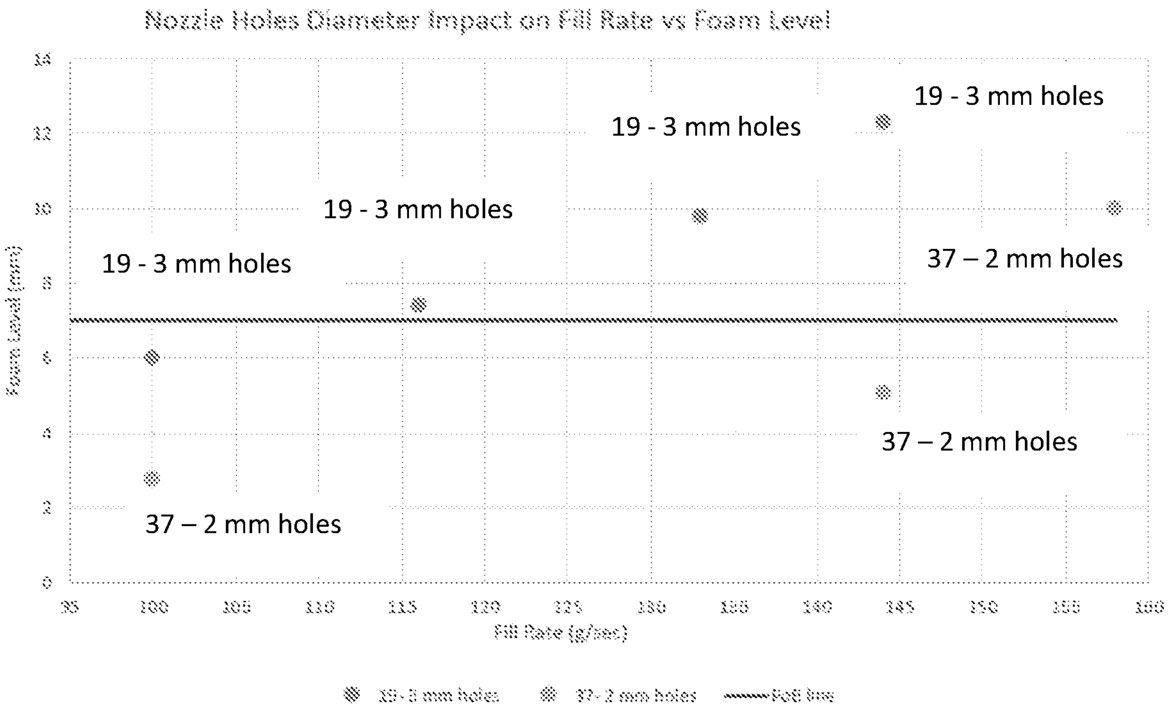
FIG. 3 is a graph showing foam level and fill rate for an exemplary nozzle components in accordance with the present disclosure.

FIG. 3 illustrates a graph that can depict the efficacy of one or more embodiments described herein. The graph characterizes the amount of foam achieved when filling bottles with low viscosity water-based solution with less than 1% surfactant at various fill rates and with various nozzle structures. "19-3 mm holes" regards filling bottles with the solution using a multi-hole nozzle component having 19 holes (e.g., 19 passageways) with diameters of 3 mm "37-2 mm" regards filling bottles with the solution using a multi-hole nozzle component having 37 holes (e.g., 37 passageways) with diameters of 2 mm. As shown in FIG. 3, reducing the diameter of the holes can achieve a laminar flow while reducing the surface area the fluid flows through; thereby reducing the amount of foam experienced, despite increases in the fill rate. In various embodiments, increasing the density of the holes, and thereby the passageways, from 19 to 37 can be enabled due to at least the 3D printing formation of the passageways. For example, the 3D printed passageways described herein can facilitate filling processes with 25% foam reduction and/or 20% faster fill rates.

A. A multi-hole nozzle component for a filling machine, the multi-hole nozzle component having a periphery, an inlet side having a surface, and an outlet side having a surface, the nozzle component further comprising a plurality of separate passageways extending through the nozzle component from adjacent its inlet side to its outlet side, wherein the passageways form a plurality of openings in the surface of the outlet side of the nozzle component, wherein each of the separate passageways has a diameter of from about 1 mm to about 3 mm and a length of from about 5 mm to about 1.5 m.

B. The multi-hole nozzle component according to paragraph A, wherein the passageways extending through the nozzle component are substantially parallel to each other.

C. The multi-hole nozzle component according to paragraph B, wherein the passageways have substantially hexagonal cross-sections, preferably substantially arc cross-sections and most preferably substantially circular cross-sections.

D. The multi-hole nozzle component according to paragraph A, wherein the passageways are sized and configured so that when liquid is dispensed through said nozzle, the liquid exits the outlet side in the form of separate streams from each passageway.

E. The multi-hole nozzle component according to paragraph A, wherein the passageways form at between 4 and 1,000 openings in the surface of the outlet side of the nozzle component.

F. The multi-hole nozzle component according to paragraph A, wherein the passageways have a surface roughness of from about 0.2 to about 50 μm and preferably about 0.4 to about 4.0 μm, and most preferably from about 0.6 to 1.0 μm.

G. The multi-hole nozzle component according to paragraph A, wherein the passageways have a distance from each other of from about 0.05 mm to about 5 mm, preferably from about 0.05 mm to about 0.5 mm and most preferably from about 0.05 mm to about 0.25 mm.

H. The multi-hole nozzle component according to paragraph A, further comprising a plurality of inlet sides and a plurality of outlet sides, wherein the inlet side is from the plurality of inlet sides, and wherein the outlet side is from the plurality of outlet sides.

I. The multi-hole nozzle component according to paragraph A, wherein the passageways comprise a bend between the inlet side and the outlet side.

J. The multi-hole nozzle component according to paragraph A, wherein a first passageway from the passageways splits into two separate passageways at a position between the inlet side and the outlet side.

K. The multi-holed nozzle component according to paragraph A, wherein a first passageway from the passageways and a second passageway from the passageways merge to form a third passageway at a position between the inlet side and the outlet side.

L. The multi-holed nozzle component according to paragraph A, wherein at least one of the passageways comprises a static mixer.

M. The multi-holed nozzle component according to paragraph A, wherein at least one of the passageways comprises a sensor.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multi-hole nozzle component for a filling machine, the multi-hole nozzle component having a periphery, an inlet side having a surface, and an outlet side having a surface, the nozzle component further comprising a plurality of passageways extending through the nozzle component from adjacent its inlet side to its outlet side, wherein the passageways form a plurality of openings in the surface of the outlet side of the nozzle component, wherein each of the separate passageways has a diameter of from about 1 mm to about 3 mm and a length of from about 5 mm to about 1.5 m, and wherein the passageways have a surface roughness of from about 0.2 to about 50 μm.

2. The multi-hole nozzle component of claim 1, wherein the passageways extending through the nozzle component are substantially parallel to each other.

3. The multi-hole nozzle component of claim 2, wherein the passageways have substantially hexagonal cross-sections or substantially arc cross-sections or circular cross-sections.

4. The multi-hole nozzle component of claim 1, wherein the passageways are sized and configured so that when liquid is dispensed through said nozzle, the liquid exits the outlet side in the form of separate streams from each passageway.

5. The multi-hole nozzle component of claim 1, wherein the length of each of separate passageway is from about 5 mm to about 75 mm.

6. The multi-hole nozzle component of claim 1, wherein the component comprises a single opening on the inlet side of the nozzle component.

7. The multi-hole nozzle component of claim 1, wherein the passageways form at between 4 and 1,000 openings in the surface of the outlet side of the nozzle component.

8. The multi-hole nozzle component of claim 1, wherein the passageways have a distance from each other of from about 0.05 mm to about 5 mm.

9. The multi-hole nozzle component of claim 1, further comprising a plurality of inlet sides and a plurality of outlet sides, wherein the inlet side is from the plurality of inlet sides, and wherein the outlet side is from the plurality of outlet sides.

10. The multi-hole nozzle component of claim 1, wherein the passageways comprise a bend between the inlet side and the outlet side.

11. The multi-hole nozzle component of claim 1, wherein the plurality of passageways comprises a first passageway that splits into two or more separate passageways at a position between the inlet side and the outlet side.

12. The multi-hole nozzle component of claim 1, wherein two or more passageways merge to form a third passageway at a position between the inlet side and the outlet side.

13. The multi-hole nozzle component of claim 1, wherein at least one of the passageways comprises a static mixer.

14. The multi-hole nozzle component of claim 1, wherein at least one of the passageways or a nozzle body comprises a sensor.

* * * * *